(12) United States Patent
Ha et al.

(10) Patent No.: US 9,722,668 B2
(45) Date of Patent: Aug. 1, 2017

(54) HOME APPLIANCE, HOME APPLIANCE SYSTEM, AND METHOD OF CONTROLLING THE SAME

(71) Applicant: LG Electronics Inc., Seoul (KR)

(72) Inventors: Mikyung Ha, Kyungsangnam-do (KR); Junpil Park, Kyungsangnam-do (KR); Bokyung Cho, Kyungsangnam-do (KR)

(73) Assignee: LG Electronics Inc., Seoul (KR)

( * ) Notice: Subject to any disclaimer, the term of this patent is extended or adjusted under 35 U.S.C. 154(b) by 184 days.

(21) Appl. No.: 14/247,863

(22) Filed: Apr. 8, 2014

(65) Prior Publication Data

US 2014/0300450 A1 Oct. 9, 2014

(30) Foreign Application Priority Data

Apr. 9, 2013 (KR) ........................ 10-2013-0038785

(51) Int. Cl.
*G08B 9/00* (2006.01)
*H04B 5/00* (2006.01)
*G08C 17/02* (2006.01)

(52) U.S. Cl.
CPC .......... *H04B 5/0031* (2013.01); *G08C 17/02* (2013.01); *G08C 2201/42* (2013.01); *G08C 2201/51* (2013.01)

(58) Field of Classification Search
CPC G08C 17/02; G08C 2201/42; G08C 2201/51; H04B 5/0031

(Continued)

(56) References Cited

U.S. PATENT DOCUMENTS

| 7,852,198 B2 | 12/2010 | Montgomery |
| 2005/0037707 A1 | 2/2005 | Lewis |

(Continued)

FOREIGN PATENT DOCUMENTS

| CN | 101364911 | 2/2009 |
| CN | 101848126 | 9/2010 |

(Continued)

OTHER PUBLICATIONS

Russian Office Action dated Jun. 2, 2015, for Russian Application No. 2014113756, with English Translation, 8 Pages.

(Continued)

*Primary Examiner* — Ojiako Nwugo
(74) *Attorney, Agent, or Firm* — Fish & Richardson P.C.

(57) ABSTRACT

A home appliance, a home appliance system, and a method of controlling the same are provided. The home appliance includes a display unit that outputs an operation setting and an operation state. The home appliance further includes a tag unit that performs Near Field Communication (NFC) with a terminal. The home appliance further includes a controller that (i) stores product information at the tag unit, (ii) receives data stored at the tag unit, (iii) changes the operation setting, (iv) controls the operation state, and (v) outputs the changed operation setting to the display unit. The controller (i) determines network connection information that is stored at the tag unit by the terminal, (ii) stores the network connection information in a communication unit, and (iii) transmits and receives data wirelessly by connecting, through the communication unit, to a network that is associated with the network connection information.

16 Claims, 12 Drawing Sheets

(58) Field of Classification Search
USPC ............... 340/6.1, 572.1–572.9, 10.1–10.5
See application file for complete search history.

(56) References Cited

U.S. PATENT DOCUMENTS

| | | | |
|---|---|---|---|
| 2005/0096760 A1 | 5/2005 | Sturm | |
| 2008/0104768 A1 | 5/2008 | Choi | |
| 2008/0204199 A1 | 8/2008 | Howarth | |
| 2008/0311959 A1* | 12/2008 | Wang | H04M 1/72519 455/566 |
| 2010/0011609 A1* | 1/2010 | Park | D06F 58/10 34/88 |
| 2010/0156639 A1 | 6/2010 | Herwig | |
| 2013/0185079 A1* | 7/2013 | Park | D06F 33/02 704/275 |
| 2013/0198813 A1* | 8/2013 | van Roermund | G06F 21/35 726/4 |
| 2014/0113692 A1* | 4/2014 | Wuidart | G06K 19/0701 455/575.1 |
| 2014/0250183 A1* | 9/2014 | Unagami | H04M 3/5166 709/204 |
| 2015/0172925 A1* | 6/2015 | Leppanen | H04W 12/04 726/7 |

FOREIGN PATENT DOCUMENTS

| | | |
|---|---|---|
| CN | 101894452 | 11/2010 |
| CN | 101998695 | 3/2011 |
| EP | 2199946 | 6/2010 |
| WO | WO 2007/099609 A1 | 9/2007 |
| WO | WO 2013/035242 A1 | 3/2013 |

OTHER PUBLICATIONS

European Search Report dated Dec. 4, 2014, on European Application No. 14163847.8, 6 Pages.

Chinese Office Action in Chinese Application No. 201410140808, dated Jan. 11, 2017, 22 pages (with English translation).

* cited by examiner (a)　　　　　　　　　　(b)

HOME APPLIANCE, HOME APPLIANCE SYSTEM, AND METHOD OF CONTROLLING THE SAME

CROSS-REFERENCE TO RELATED APPLICATION

This application claims the priority benefit of Korean Patent Application No. 10-2013-0038785, filed on Apr. 9, 2013 in the Korean Intellectual Property Office, the disclosure of which is incorporated herein by reference.

FIELD

This disclosure relates to a home appliance, a home appliance system, and a method of controlling the same, and more particularly, to a home appliance, a home appliance system, and a method of controlling the same that change and control communication settings of the home appliance through data transmission and reception with a terminal.

BACKGROUND

In general, laundry processing devices include a washing machine, a dryer, and a washing machine having a dryer function.

In order to remove pollutants from the laundry such as clothes and bedding using water and detergent and a mechanical operation, a washing machine is a device that performs a process such as washing, rinsing, and dehydration. Such washing machines are classified into a top load type washing machine of rotating a drum in which the laundry is filled about a vertical axis and a front load type washing machine of rotating a drum in which the laundry is filled about a horizontal axis.

The dryer is a device that dries the laundry to be dried by applying warm air to the laundry to be dried and that injects the laundry to be dried into a rotating drum and that dries the laundry by applying warm wind or cold wind into the drum.

The washing machine having a dryer function has both a washing function and a dry function and is a device that injects the laundry such as clothes into a rotating drum and that selects a desired function and that performs washing or drying.

Nowadays, as Internet is generally used within a home, a home appliance using a network is important. However, for Internet connection, connection setting thereof is necessary, but a keyboard or an input device similar thereto may not be provided in an entire home appliance and thus a method of connecting the home appliance to the network is requested.

SUMMARY

According to an innovative aspect of the subject matter described in this specification may be embodied in a home appliance that includes a display unit that outputs an operation setting and an operation state; a tag unit that performs Near Field Communication (NFC) with a terminal; and a controller that (i) stores product information at the tag unit, (ii) receives data stored at the tag unit, (iii) changes the operation setting, (iv) controls the operation state, and (v) outputs the changed operation setting to the display unit, where the controller (i) determines network connection information that is stored at the tag unit by the terminal, (ii) stores the network connection information in a communication unit, and (iii) transmits and receives data wirelessly by connecting, through the communication unit, to a network that is associated with the network connection information.

These and other embodiments can each optionally include one or more of the following features. The tag unit includes a tag storage unit that stores the product information and the network connection information; and a transmitting and receiving unit that recognizes the terminal that contacts the tag unit or communicates with the tag unit when within a predetermined distance. The controller instructs the display unit to display a connection state, in response to the home appliance being connected to the network according to the network connection information. The controller instructs the display unit to display an error message, in response to the home appliance not being connected to the network.

The controller controls a transmitting of data associated with the home appliance according to a request received from the terminal or an external server and controls operation of the home appliance according to a received control instruction in response to the home appliance being connected to the network through the communication unit. The controller determines a state of the tag unit, receives new data, and updates network connection information, a control program, or controls operation to correspond to new data in response to power of the home appliance being turned on. The tag unit stores data received from the terminal at the tag storage unit in response to the terminal contacting the tag unit independent of the home appliance being turned on. The tag unit is detachably provided on the home appliance.

According to another innovative aspect of the subject matter described in this specification may be embodied in a home appliance system that includes a terminal having a Near Field Communication (NFC) function; a server that stores and manages data associated with a plurality of home appliances; and a home appliance that (i) has a tag unit for NFC, (ii) stores product information at the tag unit, and (iii) is connected to a predetermined network according to network connection information stored at the tag unit by the terminal, where the terminal (i) receives the product information stored at the tag unit when contacting the tag unit, (ii) stores the network connection information at the tag unit, and (iii) stores the product information associated with the home appliance at the server.

These and other embodiments can each optionally include one or more of the following features. The terminal receives the product information by contacting the tag unit and stores the network connection information at the tag unit. The terminal stores an application for controlling the home appliance. The terminal performs product registration through an NFC module based on a registered product existing in response to the application being executed. The terminal (i) searches for a network to which the terminal can connect, connects to the network, stores the network connection information, and outputs guidance associated with the tag unit, in response to registering a product and (ii) stores the network connection information at the tag unit in response to the tag unit being recognized. The terminal registers the home appliance at the server by matching product information of the home appliance to a network identifier associated with the server. The terminal receives and displays information associated with the home appliance matched to the network identifier in response to the home appliance being registered.

According to another innovative aspect of the subject matter described in this specification may be embodied in a method of controlling a home appliance system that includes the actions of starting product registration of a home appliance at a terminal; collecting network connection information associated with an available network and storing the network connection information associated with the available network; receiving product information associated with the home appliance stored at a tag unit of the home appliance; storing the network connection information associated with the available network at the tag unit in response to the terminal interacting with the tag unit of the home appliance using Near Field Communication (NFC); and releasing tag contact information, matching product information to a network identifier, and registering the product information at a server.

These and other embodiments can each optionally include one or more of the following features. The actions further include collecting network information associated with other available networks, connecting to an available network of the other available networks, and storing network connection information associated with the available network of the other available networks; and displaying a tag method using NFC in response to storing the network connection information associated with the available network of the other available networks. The actions further include completing product registration according to a response from the server; and receiving and displaying data associated with the network identifier.

According to another innovative aspect of the subject matter described in this specification may be embodied in a method of controlling a home appliance that includes the actions of determining a state of a tag unit for Near Field Communication (NFC); in response to determining the state of the tag unit for Near Field Communication (NFC), receiving network connection information stored at a tag unit; connecting to a network according to the network connection information; transmitting data and determining registration status of the home appliance by connecting to a server in response to the home appliance being connected to the network; transmitting data associated with an operation and a state of the home appliance to a terminal associated with a registered network identifier; and controlling operation of the home appliance based on data received from the terminal.

These and other embodiments can each optionally include one or more of the following features. The network connection information is stored at the tag unit by the terminal using NFC. The actions further include displaying a connection state in response to the home appliance being connected to the network; and displaying an error state in response to an error occurring in a connection state. The actions further include storing product information at the tag unit.

DETAILED DESCRIPTION

Figure 1:
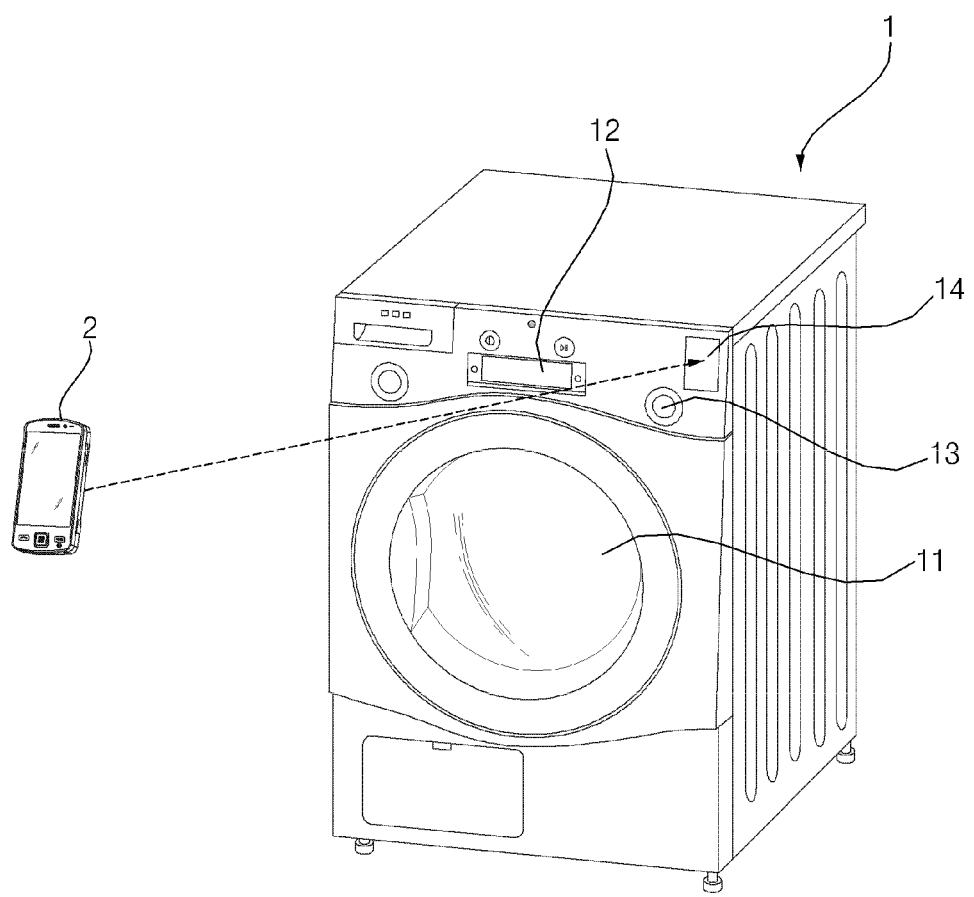
FIG. 1 is a diagram illustrating an example configuration of a home appliance system formed with a home appliance and a terminal.
Figure 2:
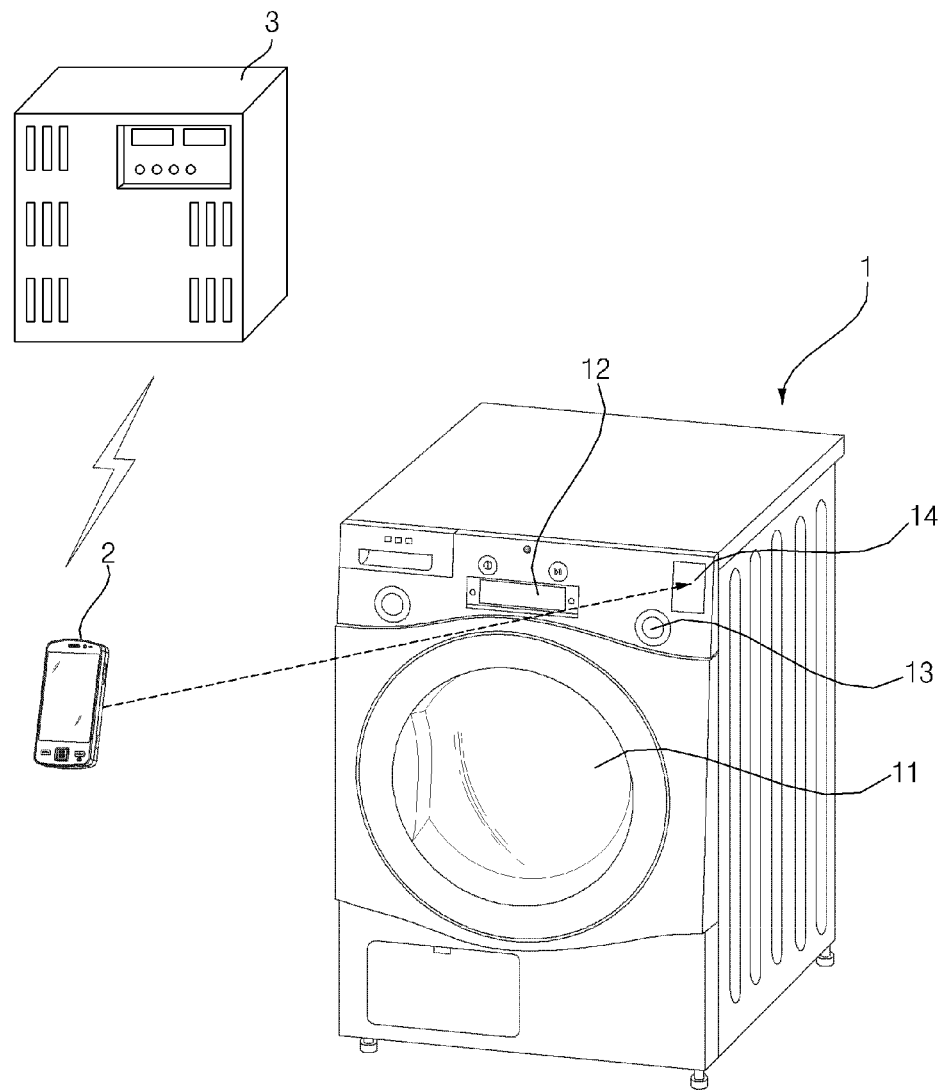
FIG. 2 is a diagram illustrating an example configuration of a home appliance system formed with a home appliance, a terminal, and a server.

FIG. 1 illustrates an example configuration of a home appliance system formed with a home appliance and a terminal, and FIG. 2 illustrates an example configuration of a home appliance system formed with a home appliance, a terminal, and a server.

Referring to FIG. 1, the home appliance system includes a home appliance 1 and a terminal 2 that communicates with the home appliance using Near Field Communication (NFC). Further, as shown in FIG. 2, the home appliance system further includes a server 3 that communicates with the home appliance 1 and the terminal 2.

The home appliance 1 includes a tag unit 14 that stores data including product information, an operation state, and failure information of the home appliance and that transmits and receives data with NFC with the terminal 2. In some implementations, when the terminal 2 contacts with the tag unit 14 or approaches within a predetermined distance from the tag unit 14, the terminal 2 and the tag unit 14 transmit and receive data. In some implementations, the tag unit 14 may be detachably formed from the home appliance 1.

Further, the home appliance 1 includes a display unit 12 that displays various information about an operation state and operation setting of the home appliance, an input unit 13 that inputs operation setting, and a door 11 that injects the laundry such as clothing into the washing machine.

The display unit 12 may be formed with a liquid crystal display (LCD) and a light emitting diode (LED) and may be formed with a touch screen in some implementations. Further, the input unit 13 includes at least one button or switch, may have a touchpad that inputs data by a touch manipulation, and when the display unit is formed with a touch screen, the touch screen functions as an input unit.

The home appliance, for example, the washing machine 1 includes a drum rotatably provided within a case that forms an external appearance to receive the laundry such as clothing, and at an inner circumferential surface of the drum, a lift is provided, and when the drum rotates, the lift may move clothes upward and downward to remove a foreign substance from the laundry. Further, the washing machine 1 further includes a plurality of sensors that detect water supply, drain, and an operation state. In some implementations, the home appliance may be a washing machine having a steam spray function, a washing machine having a dry function, a dryer, or another type of home appliance having an NFC function.

The terminal 2 includes a tag unit 14 of the home appliance 1, a communication module that transmits and receives data with NFC, an input unit, and a display unit and transmits specific data to the home appliance and displays data of the home appliance.

The terminal 2 contacts with the tag unit 14 of the home appliance through the communication module, receives data of the home appliance, and records and stores data stored at the terminal in the tag unit. In this case, the terminal 2 may receive and transmit data with a contact of one time with the tag unit of the home appliance 1. Here, a contact includes a case in which the terminal and the tag unit recognize each other and transmit and receive data when the terminal and the tag unit approach within a predetermined distance without a physical contact as well as a physical contact between the terminal and the tag unit.

The terminal 2 has an application that transmits and receives and controls data with the home appliance 1, executes the application, displays information of the home appliance 1 received through a contact with the tag unit 14, controls the home appliance, and diagnoses whether the home appliance is in a failure state.

In this case, when the terminal 2 executes an application, the terminal 2 connects to the server 3, matches information of the home appliance 1 to a network identifier for connection to the server, and registers the home appliance 1 to the server 3, thereby monitoring and controlling the home appliance 1 through the network.

The server 3 includes a database that stores information of the home appliance matched to the network identifier, and when the home appliance is connected to the network, the server 3 collects and stores information from the home appliance. In this case, the server 3 registers and stores home appliance information through the terminal 2, and when the home appliance is not connected to the network, the server 3 collects and stores information of the home appliance through connection to the terminal 2.

Further, when failure diagnosis of the home appliance is executed in the terminal 2, the server 3 may store data of failure diagnosis and provide addition data according to failure diagnosis according to a request of the terminal 2.

Figure 3:
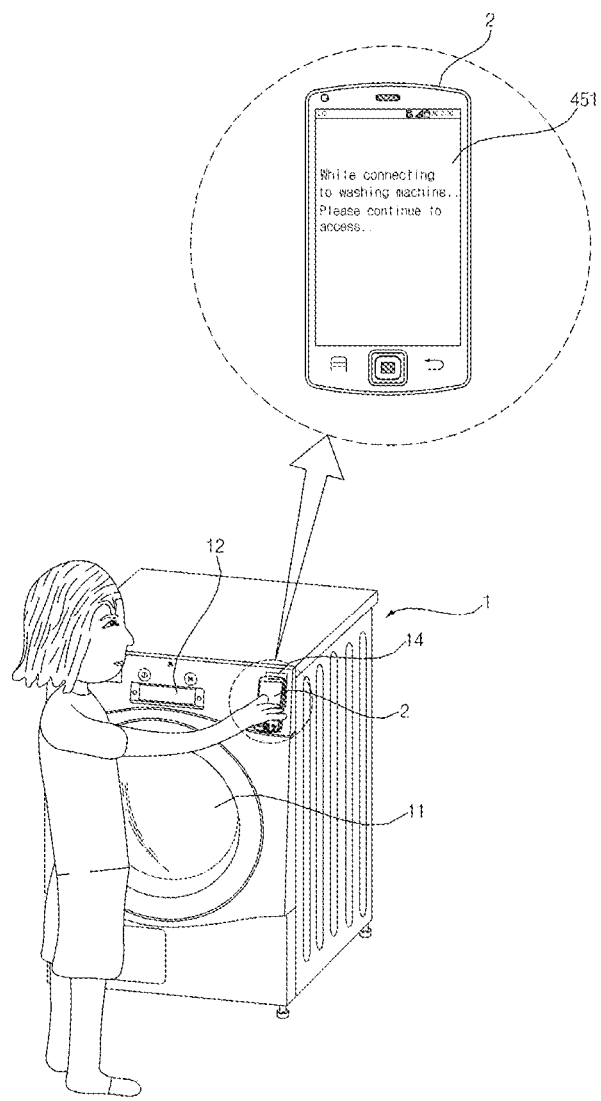
FIG. 3 is a diagram illustrating an example of communication through contact between a terminal and a home appliance.

FIG. 3 illustrates an example of communication through contact between a terminal and a home appliance.

Referring to FIG. 3, as the terminal 2 contacts with the tag unit 14 of the home appliance 1, a user may determine information of the home appliance 1 through the terminal.

When the terminal 2 approaches within a predetermined distance from the tag unit 14 of the home appliance 1 and maintains for a predetermined time or more, the terminal 2 receives data stored at the tag unit of the home appliance, transmits setting data of the home appliance to the tag unit, and stores the setting data at the tag unit.

In this case, for data transmission and reception with the home appliance, guidance is displayed to maintain a contact state for a predetermined time on a screen 451 of the display unit of the terminal 2. Guidance may be displayed with a message or an image and may be simultaneously output with a sound.

When data transmission and reception is complete, the terminal 2 may display guidance according to communication completion on the screen and output a predetermined effect sound corresponding thereto through the speaker.

Figure 4:
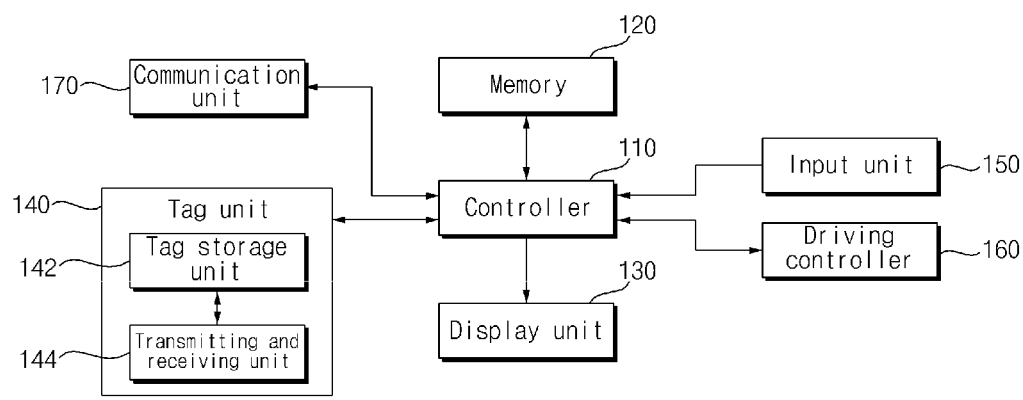
FIG. 4 is a block diagram illustrating an example configuration of a home appliance.

FIG. 4 illustrates an example configuration of a home appliance.

Referring to FIG. 4, the home appliance (hereinafter, the washing machine 1) includes a tag unit 140, a communication unit 170, a memory 120, a display unit 130, an input unit 150, a driving controller 160, and a controller 110 that controls entire operations, as described above.

Further, the washing machine 1 includes a plurality of sensors and further includes elements such as a detection unit that detects a state of the washing machine and a power supply unit and a description of other elements will be omitted. In this case, the detection unit includes a sensor that detects a temperature, a pressure, a voltage, a current, a water level, and the rotation number and applies detected or measured data to the controller 110. For example, when supplying water to a wash processing device or when draining water from a wash processing device, the detection unit measures a water level and a temperature of supplied water, and a rotation speed of a washing tank or a drum.

The driving controller 160 controls operation of the washing machine 1 so that the washing machine 1 performs a preset operation to correspond to a control signal applied from the controller 110. Accordingly, the washing machine 1 performs a series of strokes such as a washing stroke, a rinse stroke, and a dehydration stroke, thereby removing pollutants of the laundry.

The driving controller 160 controls a motor that rotates a drum according to a control instruction of the controller 110, controls opening and closing of various valves provided in the washing machine, and controls operation of a drain pump. In this case, the driving controller 160 is separately divided according to a configuration like a motor controller and a pump controller to control the washing machine.

At the memory 120, control data for controlling operation of the washing machine, operation data according to a washing machine course or a program, setting data input through the input unit 150, interface data in which information displayed on a screen of the display unit 130 is stored, measurement data detected while operating the washing machine, and failure data of operation when an error occurs are stored.

Further, at the memory 120, data input from the terminal 2 through the tag unit 140 and connection data for server connection are stored, and when the washing machine is connected to the server 3, data transmitted and received from the server 3 are stored.

In some implementations, the memory 120 may include a non-volatile memory such as at least one magnetic disk storage device, flash memory device, or other non-volatile solid phase memory devices.

For example, the memory 120 may include an Electronically Erasable and Programmable Read-Only Memory (EE-PROM). The EE-PROM may write and erase information by the controller 110. As power is turned off, even if power supply is stopped, the EE-PROM may be a storage device that does not erase but maintains information stored therein.

The input unit 150 has at least one input means that inputs a predetermined signal or data to the washing machine by a user manipulation and receives an input of data such as an operation course and operation setting according to operation of the washing machine to apply the data to the controller 110.

The input unit 150 may be formed with a button, a dome switch, a touch pad (capacitive/resistive), a jog wheel, a jog switch, a finger mouse, a rotary switch, and a jog dial or may be applied to any device that generates predetermined input data by a manipulation such as press, a rotation, a pressure, and a contact.

The display unit 130 displays information input by the input unit 150 and operation information and state information of the washing machine to correspond to a control instruction of the controller 110. The display unit 130 may display a connection state when performing a tag contact with the terminal 2 to correspond to a control instruction of the controller 110 and display a connection state, when the washing machine is connected to the network according to preset connection information.

Such a display unit 130 is a light emitting body of a form such as a light emitting diode (LED), a liquid crystal display (LCD), and organic electroluminescence (EL) and visualizes and displays state information or failure information of the washing machine 1. In this case, the display unit 130 displays information of the washing machine in at least one form of a character, an image, a numeral, and a special character.

Further, the washing machine 1 includes an output means such as a lighting or flickering lamp, a vibration element, and a speaker in addition to the display unit 130.

The communication unit 170 includes at least one wire or wireless communication module and transmits and receives data by connecting to the network according to connection setting. The communication unit 170 transmits and receives data to and from the server 3 when connecting to the network and transmits data of the washing machine according to a request of the terminal 2. In some implementations, the communication unit 170 connects based on intrinsic information of the washing machine when connecting to the server and transmits and receives data through user authentication using ID when connecting to the terminal 2.

The controller 110 controls an input and output of data by the input unit 150 and the display unit 130, manages data of the memory 120, and controls data transmission and reception by the communication unit 170 and the tag unit 140.

The controller 110 stores data of the washing machine at the tag unit 140, calls data recorded at the tag unit 140, and changes and controls setting of the washing machine. The controller 110 determines a state of the tag unit 140 and reads or records data.

The controller 110 determines whether the washing machine is connecting to the terminal 2 according to flag setting of the tag unit 140 and determines whether new data exists. The controller 110 reads header data of the tag unit, determines whether the washing machine is connecting to the terminal 2, and determines a data state according to flag setting.

When the tag unit is in a standby state, the controller 110 reads data stored at the tag unit, resets a state of the tag unit, and when washing machine data is generated, the controller 110 stores the washing machine data at the tag unit. For example, when an error occurs in the washing machine, the controller 110 records diagnosis data according to the error at the tag unit.

The tag unit 140 includes a tag storage unit 142 that stores data and a transmitting and receiving unit 144 that performs data transmission between the terminal 2 and the controller 110.

The tag unit 140 may operate with a simple contact (tag operation) with the terminal 2 according to a NFC method and process and transmit and receive data with a desired method. NFC can be used in various devices, and when entire terminals including an NFC module correspond to a data specification, data can be synchronized. NFC can be generally performed within a communication distance of less than ten centimeters. Because NFC has a small communication distance, personal information may be less likely to be leaked. When a NFC function is activated, the tag unit 140 may read or write data through a tagged device.

When contacting with the terminal 2, the tag unit 140 represents that the washing machine is contacting with the terminal by setting a flag, and even when new data exists, the tag unit 140 sets a flag thereof and displays a data state.

In the tag storage unit 142, data received and recorded from the terminal 2 and washing machine data recorded by the controller 110 are each divided and stored. For example, in the tag storage unit 142, setting data for changing washing machine setting by the terminal 2, and operation control data for controlling operation may be stored, and diagnose data for diagnosing an operation state of the washing machine or diagnose result data with a combination of data detected when operating the washing machine may be stored, and data about a present operation state of the washing machine may be stored.

Further, intrinsic information and model information of the washing machine 1 is stored at the tag storage unit 142. In some implementations, the model information may include a production company and a model name of the washing machine and information on whether the washing machine can communicate. In some implementations, the terminal 2 receives model information and intrinsic information of the washing machine stored at the tag storage unit 142, distinguishes the washing machine, and registers the corresponding washing machine at the server 3.

The transmitting and receiving unit 144 transmits data stored at the tag storage unit 142 or stores received data at the tag storage unit 142 when contacting with the terminal 2. In this case, the transmitting and receiving unit 144 communicates with the terminal 2 according to an NFC method.

Even when the washing machine 1 is turned off and does not operate, the tag unit 140 may separately operate from the washing machine and may be detachably formed from the washing machine 1 in some cases.

In some implementations, in a state in which the washing machine is turned off, when the terminal 2 contacts with the tag unit 140, the tag unit 140 may transmit previously stored data to the terminal 2 and receive data from the terminal 2, and display existence of new data with a flag.

When power is turned on and operation of the washing machine is started, the controller 110 determines a state of the tag unit 140, receives data of the tag unit 140 recorded in a turn-off state, and changes setting thereof or performs operation.

The controller 110 controls the washing machine or stores specific data at the tag unit 140 based on data recorded in the tag unit 140, and particularly, when data stored at the tag unit 140 is network connection information, the controller 110 stores the network connection information at the memory 120, applies the network connection information to the communication unit 170, connects to a designated Access Point (AP) through the communication unit 170, and is connected to the network.

When a network connection through the communication unit 170 is successful, the controller 110 transmits washing machine information to the server 3 by connecting to the server 3. In some implementations, the controller 110 is registered at the server 3 by the terminal 2 and is thus connected to the server 3 based on the intrinsic information such as model information of the washing machine. Further, when a network connection through the communication unit 170 is succeeded, the controller 110 may transmit information of the washing machine to the terminal 2 through the communication unit 170 without a contact through the tag unit 140.

Figure 5:
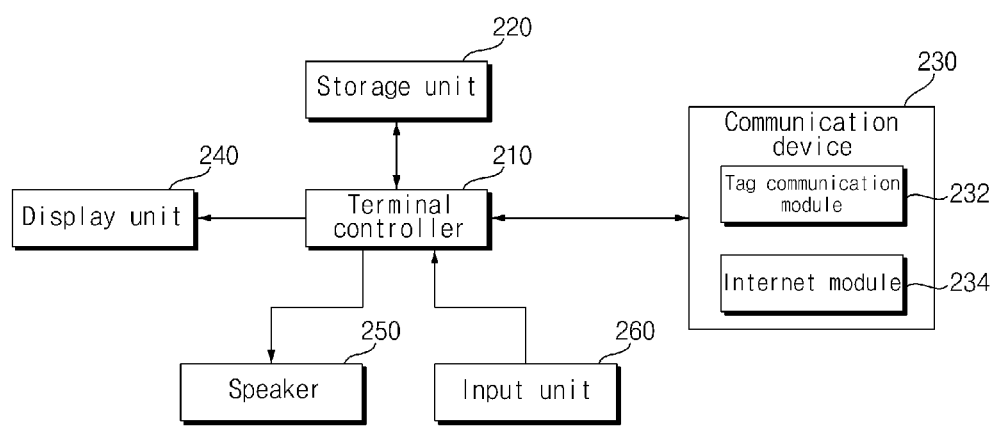
FIG. 5 is a block diagram illustrating an example configuration of a terminal.

FIG. 5 illustrates an example configuration of a terminal.

The mobile terminal may be a folding type, a bar type, a swing type, a slider type, or other type of mobile terminal having an NFC function. FIG. 5 illustrates an example bar type mobile terminal having a front surface touch screen is described as a terminal 2.

Referring to FIG. 5, the terminal 2 includes a communication unit 230, a storage unit 220, a display unit 240, an input unit 260, a speaker 250, and a terminal controller 210 that controls entire operations of the terminal.

The storage unit 220 stores control data for controlling operation of the terminal, operation data of an operation state of the terminal, a plurality of application data for performing a specific function, and data input by a user.

The display unit 240 displays an operation state of a terminal or data of the washing machine received through the communication unit on the screen according to a control instruction of the terminal controller 210.

The display unit 240 is a means that visually displays information and for example, the display unit 240 may include at least one of a liquid crystal display (LCD), a thin film transistor-liquid crystal display (TFT-LCD), an organic light-emitting diode (OLED), a flexible display, and a three-dimensional display (3D display). In this case, the display unit 240 may exist in at least two according to an implementation form of the terminal. For example, the terminal may simultaneously have an external display unit and an internal display unit.

Further, as touchpads are overlapped in a layer structure, the display unit 240 functions as an input unit 260 to input information by a user's touch by operating as a touch screen.

The input unit 260 may include at least one button or switch, include a separate touchpad, and input an instruction such as communication, mouse point movement, screen scrolling, start, and end.

The speaker 250 may be provided in a form of a receiver or a speaker. Further, a camera may be provided in a form appropriate to photograph an image or a moving picture of a user. A microphone may be provided in a form appropriate to input a user's voice and other voices.

The communication unit 230 includes a tag communication module 232 that transmits and receives data by contacting with the tag unit 140 of the washing machine 1 and an Internet module 234 that transmits and receives data to and from the server 3 through a predetermined network connection. Further, the communication unit 230 may include a mobile communication module that transmits and receives data by connecting to the mobile communication network.

The terminal controller 210 executes an application corresponding to data input through the input unit 260 and controls the terminal to perform a specific operation. The terminal controller 210 stores data input through the input unit 260 or the communication unit 230 at the storage unit 220 and controls to output the data through the display unit 240 or the speaker 250.

The terminal controller 210 controls to display data of the washing machine received through the tag communication module 232 of the communication unit 230 on the screen through the display unit 240 and stores the data at the storage unit 220. In some implementations, the terminal controller 210 matches model information and intrinsic information of the washing machine 1 to a network identifier and registers the model information and the intrinsic information at the server 3 connected through the Internet module 234 of the communication unit. When the washing machine is normally registered to correspond to a response of the server 3, the terminal controller 210 remotely controls and monitors the washing machine using matched ID.

Further, the terminal controller 210 sets network connection information of the washing machine 1 to correspond to data input through the input unit 260, and when contacting with a tag of the washing machine 1 through the tag communication module 232, the terminal controller 210 records network connection information at the tag unit 140 of the washing machine 1.

In some implementations, when setting wireless communication, the terminal controller 210 searches for an Access Point (AP) that can connect, sets network connection information including information of the selected AP, a password thereof, and security setting, and transmits the network connection information to the washing machine.

Accordingly, the washing machine 1 stores network connection information received through the tag unit 140 and is connected to the network by connecting to a selected AP.

In some implementations, when the washing machine 1 is a model in which a network connection is impossible, upon registering to the server 3, if the washing machine 1 is a previously registered washing machine, when an error exists in washing machine information, the terminal controller 210 controls the display unit 240 to display an error.

FIGS. 6 to 10 illustrate example methods in which a terminal communicates with a home appliance.

Figure 6:
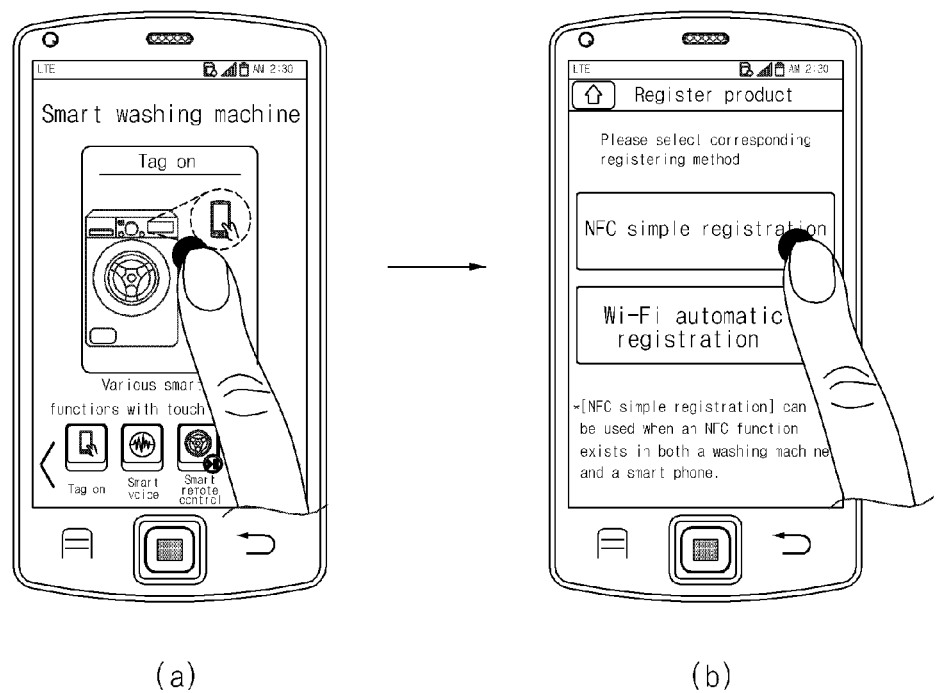
FIGS. 6 to 10 are terminal screens illustrating an example method in which a terminal communicates with a home appliance.

FIG. 6 illustrates a menu screen output to the display unit 240 when an application for controlling the washing machine of a terminal is executed.

As shown in FIG. 6(*a*), when an application for controlling the washing machine is executed, each of menus that execute control, information display, setting, and diagnostic of the washing machine through a contact with the tag unit 140 of the washing machine 1 is displayed with a predetermined icon.

When a predetermined icon is selected, a guide that describes a function of the selected icon may be displayed, and in some cases, an image that implies a function may be displayed. For example, when a tag on menu is selected, in the display unit 240, a guide of a method of transmitting and receiving data through contact with the tag unit 140 of the washing machine may be displayed together with a tag on sub-menu.

When an application is executed, the terminal controller 210 receives an input of a network identifier and is connected to the server 3 through the communication unit 230, and when an application is initially executed, the terminal controller 210 registers a new network identifier.

When a registered washing machine does not exist at a network identifier, i.e., when registration of a new washing machine is necessary, the terminal controller 210 controls to display a product registration menu of the washing machine on the screen to register the washing machine, as shown in FIG. 6(*b*). In some implementations, the terminal controller 210 matches washing machine information to a network identifier to register the washing machine at the server 3.

When NFC simple registration is selected by a touch or a button input in a product registration menu displayed on the screen, the terminal controller 210 receives information of the washing machine through the tag communication module 232, registers the washing machine 1, and sets the washing machine to be connected to the network.

The terminal controller 210 sets network connection information and transmits the network connection information to the tag unit 140 of the washing machine 1 through the tag communication module 232, thereby enabling the washing machine to connect to the network, and matches washing machine information received from the tag unit 140 to a network identifier to register the washing machine to the server 3. Therefore, when the washing machine is registered, upon executing a next application, information of the washing machine corresponding to the network identifier may be automatically displayed according to data received from the server 3. In some implementations, the washing machine model may be a model that can be connected to the network.

Figure 7:
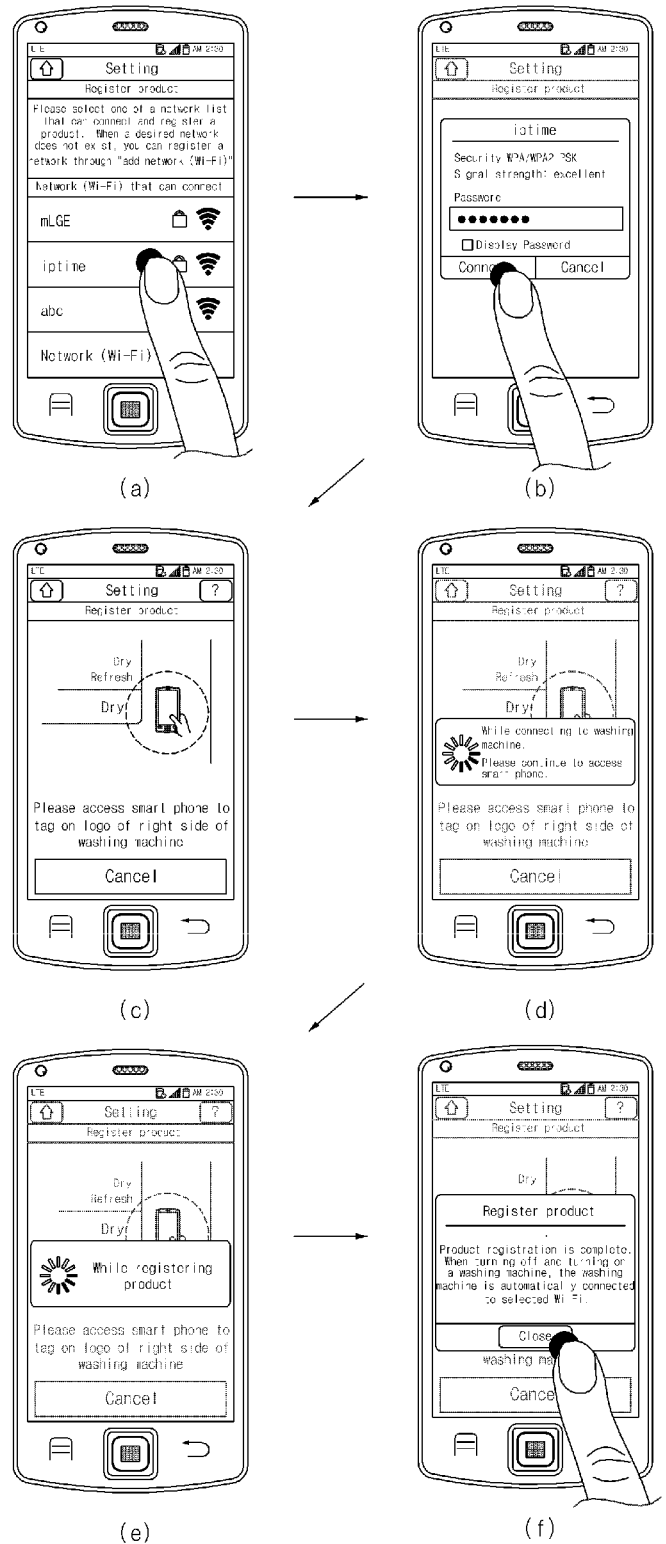

FIG. 7 illustrates an example NFC simple registration method of FIG. 6.

When NFC simple registration is selected, the terminal controller 210 searches for an AP that can be connected by wireless and outputs an AP list that can connect on a screen, as shown in FIG. 7(a).

When one of the AP list is selected, a password input screen of the selected AP is displayed, as shown in FIG. 7(b).

In this case, security setting information of the selected AP and information about signal strength is displayed, and a password input window is displayed. When the password input window is selected, a key input menu that can input a character or a numeral is displayed in a partial area on the screen.

As a password input is complete, when a connection key is selected, a message that guides so that the terminal 2 contacts with the tag unit 140 of the washing machine 1 is displayed on the screen, as shown in FIG. 7(c).

In some implementations, a guide of tag on information, i.e., a position of the tag unit of the washing machine or a method of contacting with the tag unit is displayed with a message or an image.

When the terminal 2 approaches within a predetermined distance from the tag unit 140 of the washing machine 1 or contacts with the tag unit 140, the tag communication module 232 of the terminal 2 and the transmitting and receiving unit of the tag unit 140 of the washing machine 1 recognize each other, and data are thus transmitted and received.

A guidance message representing a connection state is displayed in the display unit 240 of the terminal 2, as shown in FIG. 7(d), and when data are transmitted and received, an advancing state is displayed according to product registration, as shown in FIG. 7(e).

The tag communication module 232 of the terminal 2 stores network connection information at the tag unit of the washing machine 1, and when information of the washing machine stored at the tag unit is received, the terminal controller 210 matches a network identifier and information of the washing machine and registers the washing machine at the server 3 through the Internet module 234. In some implementations, by applying network connection information received through the tag unit 140 to the communication unit 170 of the washing machine, the controller 110 of the washing machine sets a network connection.

When product registration is complete, a guide message according to product registration completion is displayed on the screen, as shown in FIG. 7(f). After power of the washing machine 1 is turned off according to guidance, when the washing machine 1 is re-operated, the washing machine 1 is connected to the network by connecting to a specific AP according to network connection information transmitted by the terminal 2. When being connecting to the network, a network connection state is displayed with an image or an icon in the display unit of the washing machine 1.

Figure 8:
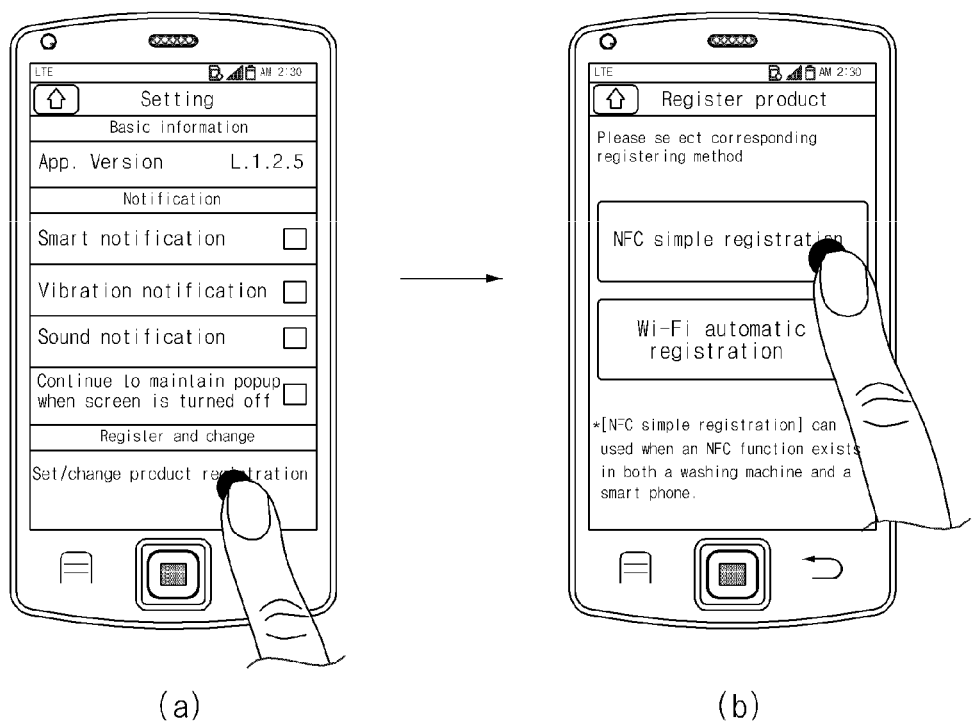

FIG. 8 illustrates an example menu screen for changing network connection information of the washing machine.

Because the washing machine can be connected only to a previously registered AP, when an AP that can connect is changed due to moving or network change, the washing machine is in a network connection impossible state. When the washing machine is not connected to the network, washing machine information reception using the network is impossible and thus network connection information of the washing machine may be reset through the tag communication module 232 of the terminal 2.

As shown in FIG. 8(a), when a setting menu of menu items of an application is selected, information of a registered product, i.e., information of the washing machine as well as setting of an application may be changed.

When product registration setting is selected to change, a product registration menu is displayed on the screen, as shown in FIG. 8(b).

In some implementations, when NFC product registration is selected, as described in FIG. 7, peripheral APs that can connect are searched for and are output in a list, and when authentication information of a selected AP is input, by setting connection information, new network connection information may be set to the washing machine 1 through a contact with the tag unit 140 of the washing machine 1.

By applying network connection information newly stored at the tag unit 140 to the communication unit 170, the controller 110 of the washing machine 1 is connected to the network.

Figure 9:
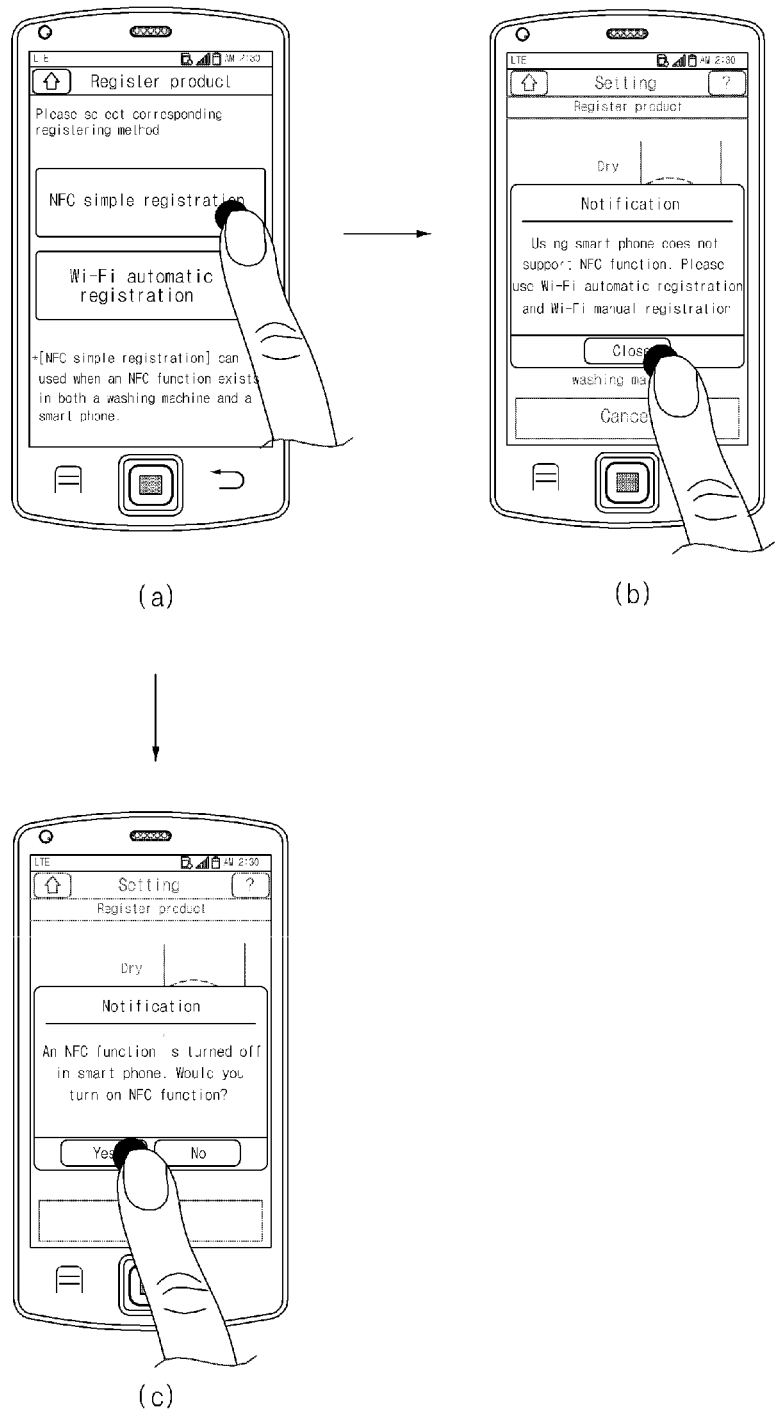
Figure 10:
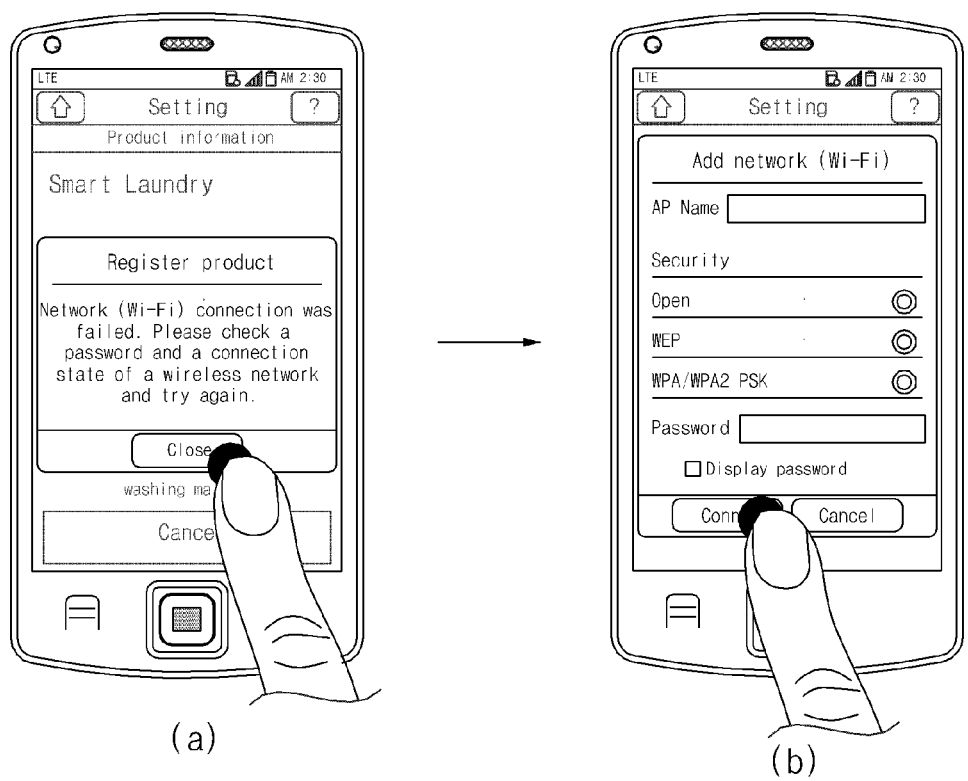

FIGS. 9 and 10 illustrate an example error screen according to product registration.

As described above, when initially registering a product or when changing setting of a previously registered product, a product registration menu is output to the display unit of the terminal 2, as shown in FIG. 9(a).

In some implementations, when NFC simple registration is selected, if the tag communication module 232 is not provided in the terminal 2, an error message is displayed on the screen, as shown in FIG. 9(b).

In some implementations, when the tag communication module is provided in the terminal 2, but does not operate, a message that guides to activate communication using the tag communication module is displayed, as shown in FIG. 9(c). In some implementations, when 'yes' is selected, the screen is changed to a setting menu of NFC communication using the tag communication module.

When an error occurs in connection information in a product registration process, an error message according to a connection failure is displayed, as shown in FIG. 10(a). When connection passwords of a selected AP do not correspond, strength of a signal is less than a predetermined value and thus when a problem exists in data transmission and reception, an error may be displayed. When a check button is selected, an AP list is displayed on the screen and thus another AP is selected.

When connecting to an AP that is not displayed in the list, network connection information may be added, as shown in FIG. 10(b).

In some implementations, in order to connect a new network, by inputting an AP name, a security method, and a password, new network information may be added.

Figure 11:
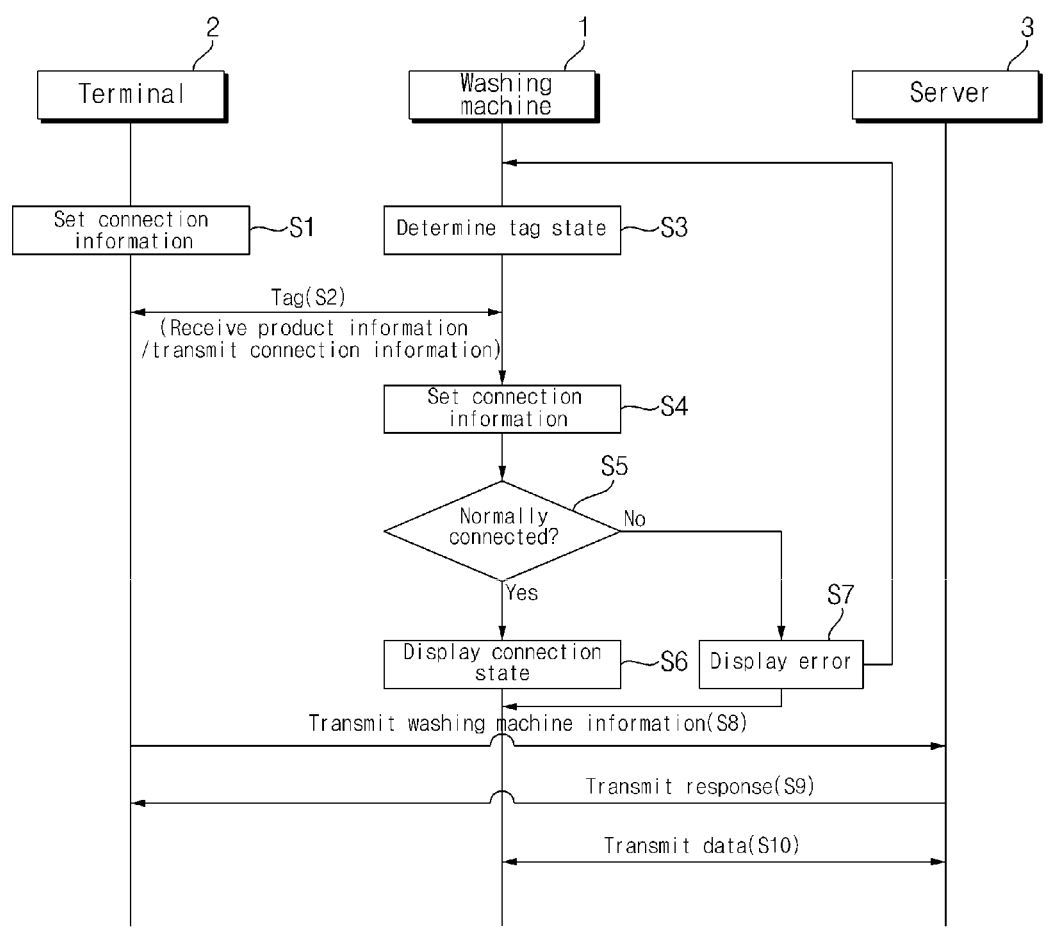
FIG. 11 is a flowchart illustrating an example data flow between a home appliance, a terminal, and a server.

FIG. 11 illustrates an example data flow between a washing machine, a terminal, and a server.

Referring to FIG. 11, when executing an application for controlling the washing machine, the terminal 2 registers information of a product, which is a target to control. In some implementations, the terminal controller 210 sets connection information so that the washing machine can be connected to a network while registering the washing machine through an NFC simple registration function (S1).

The washing machine 1 determines a state of the provided tag unit 140 and stores intrinsic information, for example, model information of the washing machine at the tag unit 140 (S3). Further, the washing machine 1 may store information about an operation state of the washing machine and diagnosis information, when an error occurs, at the tag unit.

When the terminal 2 performs simple registration, if connection information setting is complete, guidance is displayed in the display unit of the terminal 2 to contact with the tag unit 140 of the washing machine 1, and thus when the terminal 2 contacts with the tag unit 140 (S2), the tag communication module 232 of the terminal 2 determines a state of the tag unit 140, receives information, for example, model information of the washing machine previously stored at the tag unit 140, and stores preset connection information at the tag unit 140. In some implementations, the terminal 2 receives washing machine information with a contact of one time and transmits connection information to the tag unit.

When a connection of the terminal 2 to the tag unit 140 is terminated, the controller 110 of the washing machine 1 checks connection termination, receives connection information stored at the tag unit 140, and applies the connection information to the communication unit 170 of the washing machine (S4).

In some implementations, power of the washing machine 1 is turned off and re-operated by a user input. In some implementations, the washing machine 1 may be immediately connected to the network without re-operation.

After re-operation, the communication unit 170 of the washing machine connects to a specific AP according to preset connection information to be connected to the network. The controller 110 determines whether the washing machine is normally connected to the network through the communication unit 170 (S5), and if the washing machine is normally connected to the network, the controller 110 controls the display unit 130 to display a connection state (S6), and when an error occurs in a connection state, the display unit 130 displays an error (S7).

The terminal 2 matches washing machine information received from the washing machine to a network identifier and transmits the matched washing machine information to the server 3 (S8). In some implementations, server registration by the terminal may be performed before connecting the washing machine to the network.

The server 3 registers the washing machine at a database according to received information and transmits a response thereof to the terminal 2 (S9).

Further, when the washing machine 1 is normally connected to the network, the washing machine 1 is connected to the server 3 and transmits data of the washing machine to the server 3 (S10).

When an application is executed, the terminal 2 displays information of the washing machine corresponding to the network identifier. When the washing machine 1 is connected to the network, the terminal 2 may receive data from the washing machine through the network or may receive and display information of the washing machine stored at the server.

Accordingly, the terminal 2 remotely monitors and controls the washing machine 1.

Figure 12:
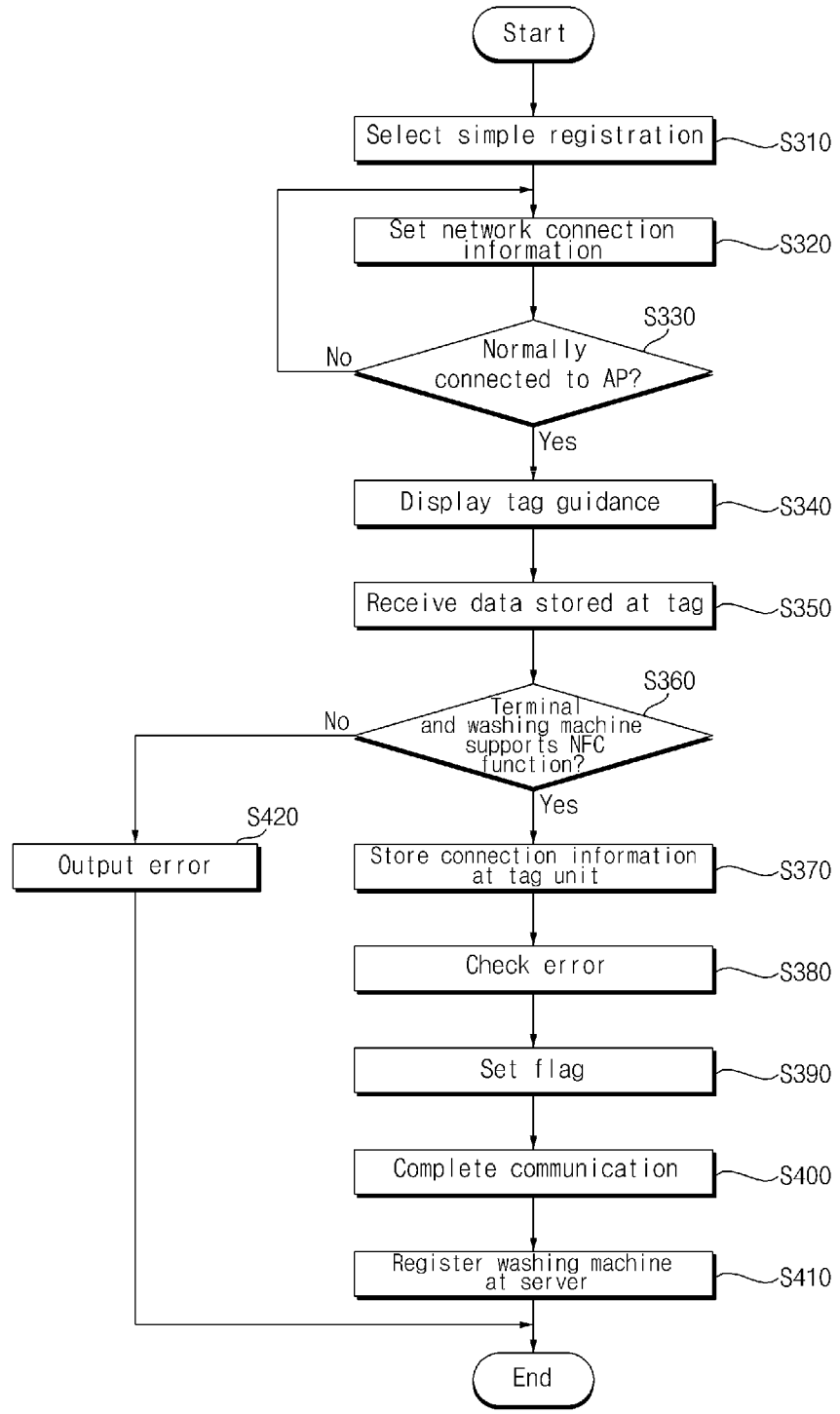
FIG. 12 is a flowchart illustrating an example method of operating a terminal.

FIG. 12 illustrates an example method of operating a terminal.

As shown in FIG. 12, when simple registration is selected in a product registration menu (S310), the terminal 2 matches the washing machine to ID and sets the washing machine to connect to the network.

The terminal controller 210 searches for and controls to display an AP list that can connect, receives an input of information about a selected AP, and sets network connection information (S320). When the washing machine is not normally connected to the AP, the terminal controller 210 controls to display an error, and a menu is displayed to reset the AP.

The terminal controller 210 determines whether the washing machine is normally connected to the selected AP according to network connection information (S330), if the washing machine is normally connected to the selected AP, the terminal controller 210 controls to display tag guidance on a screen of the display unit 240 (S340). In some implementations, guidance of a tag method such as a guide message, i.e., a method of contacting with the tag unit including a tag unit position of the washing machine is displayed with a message or an image.

When the terminal 2 adjacently positions within a predetermined distance from the tag unit 140 of the washing machine 1 or contacts with the tag unit, the tag communication module of the terminal 2 and the transmitting and receiving unit of the tag unit 140 recognize each other and transmit and receive data (S350).

In some implementations, the terminal controller 210 checks whether the terminal or the washing machine supports an NFC function and determines whether the washing machine can be connected to the network (S360). When at least one of the terminal or the washing machine does not support an NFC function, the terminal controller 210 outputs an error (S420) and stops registration.

When the terminal and the washing machine support the NFC function, the tag communication module 232 receives and analyzes information of the washing machine stored at the tag unit 140, transmits preset connection information to the tag unit 140, and stores the preset connection information at the tag unit 140 (S370). The terminal controller 210 checks an error of data received through the tag communication module 232 (S380), and if data is normal, the terminal controller 210 sets a flag of the tag unit 140 (S390) and terminates a connection (S400).

In some implementations, the terminal 2 receives information of the washing machine within a short time with a contact of one time and simultaneously stores network connection information at the tag unit of the washing machine.

The terminal 2 outputs guidance of communication completion to the display unit 240, matches received information of the washing machine and the network identifier, and registers the washing machine at the server 3 (S410).

In some implementations, the server 3 determines whether the washing machine is previously registered with another network identifier, registers the washing machine in a database, and transmits a response according to registration completion to the terminal 2.

Thereafter, when the washing machine is connected to the network, the terminal 2 receives data of the washing machine through the network, receives data stored at the server, and remotely monitors or controls the washing machine.

Figure 13:
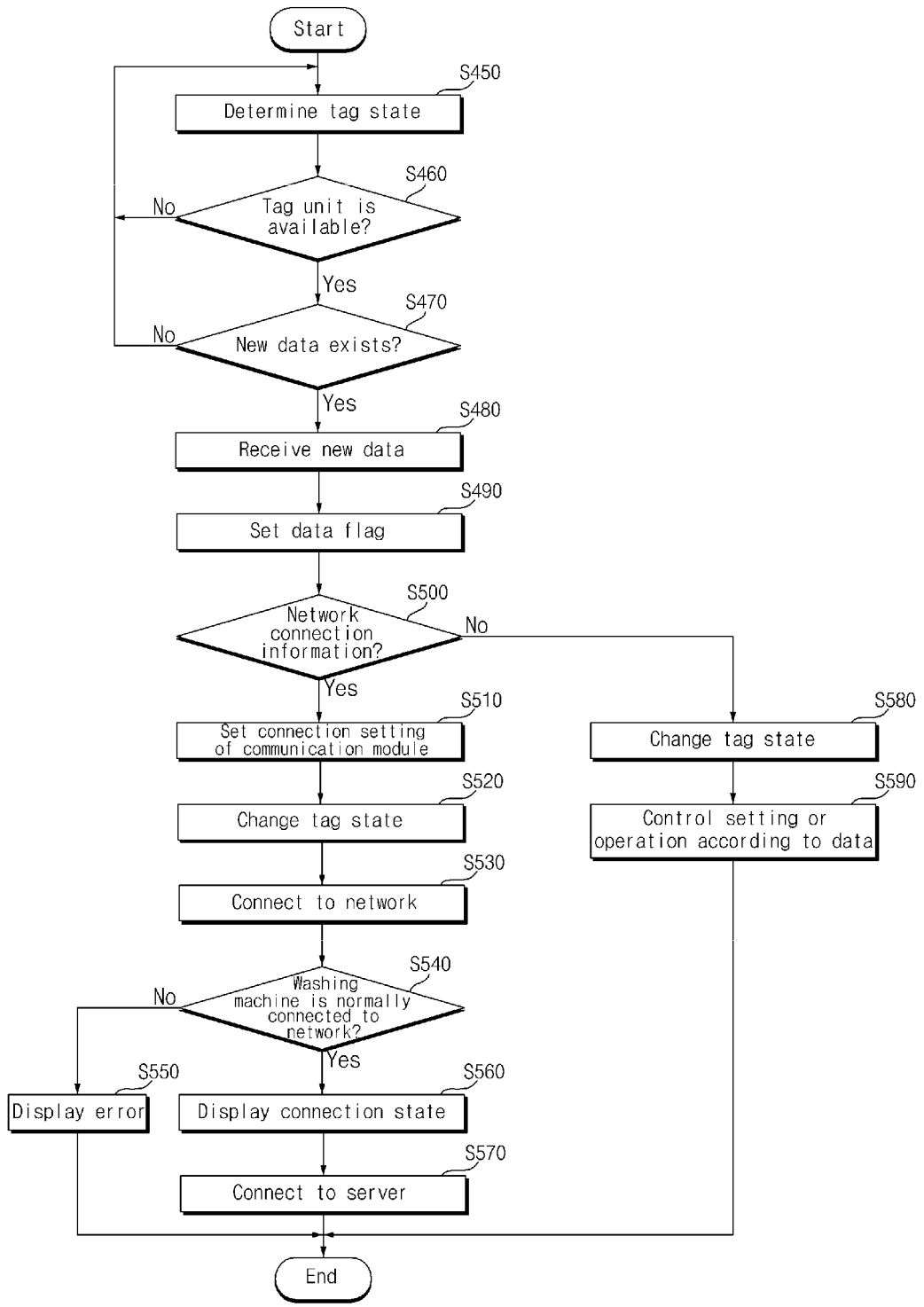
FIG. 13 is a flowchart illustrating an example method of controlling a home appliance.

FIG. 13 illustrates an example method of controlling a washing machine.

When the controller 110 of the washing machine 1 is initially driven, the controller 110 of the washing machine 1 stores the washing machine information at the tag unit 140. The controller 110 determines a state of the provided tag unit 140 (S450) and determines whether the tag unit 140 is available (S460).

In some implementations, when the terminal 2 contacts with the tag unit 140, the terminal 2 awaits according to flag setting, and when communication with the terminal is complete, flag setting is changed and the tag unit 140 is in an available state.

The controller 110 determines whether new data exists at the tag unit 140 (S470), and when new data exists, the controller 110 receives the new data from the storage unit of the tag unit 140 (S480). Further, the controller 110 may store operation information of the washing machine or failure information, when an error occurs in the washing machine, at the tag unit. In some implementations, by resetting a data flag, the controller 110 control to display that data is checked or that new data was recorded (S490).

The controller 110 determines whether new data recorded by the terminal is network connection information (S500), and if new data is network connection information, the controller 110 applies network connection information to the communication unit 170 and sets a network connection of the communication unit 170 (S510). The controller 110 controls the terminal to be in a state that can contact by changing a flag of the tag unit (S520).

The communication unit 170 is connected to the network by connecting to a specific AP according to network connection information (S530).

The controller 110 determines whether the washing machine is normally connected to the network (S540), if the washing machine is normally connected to the network, the controller 110 controls the display unit 140 to display a connection state (S560). The controller 110 transmits washing machine data by connecting to the server 3 through the communication unit 170 (S570) and changes operation of the washing machine or transmits state information of the washing machine to the terminal according to a request of the terminal by communicating with the terminal 2.

If the washing machine is not normally connected to the network, the controller 110 controls to display an error (S550). In some implementations, the controller 110 may receive and reset new network connection information through the tag unit through the terminal 2.

In some implementations, when the washing machine is re-operated, registered network connection information is applied, but in some implementations, by immediately applying without re-operating the washing machine, the washing machine may be connected to the network.

If new data is not network connection information at S500, the controller 110 analyzes received data, changes a tag state (S580), changes washing machine setting according to data, controls operation of the washing machine, or updates course information or control data of the washing machine (S590).

Therefore, product information of the washing machine is registered at the terminal and the server through NFC with the terminal, and the washing machine can be simultaneously connected to the network. The washing machine can be connected to the network without an input key or a connection program for connection to the network and change network connection information, as needed. Accordingly, the washing machine can be remotely controlled and monitored through the terminal or the server by connecting to the network.

What is claimed is:

1. A home appliance comprising:
   a display unit that outputs an operation setting and an operation state;
   a tag unit that performs Near Field Communication (NFC) with a terminal; and
   a controller that (i) stores product information at the tag unit, (ii) receives data stored at the tag unit, (iii) changes the operation setting, (iv) controls the operation state, and (v) outputs the changed operation setting to the display unit,
   wherein the controller (i) determines network connection information that is stored at the tag unit by the terminal, (ii) stores the network connection information in a communication unit, (iii) transmits and receives data wirelessly by connecting, through the communication unit, to a network that is associated with the network connection information, (iv) transmits data of the home appliance to a server by connecting to the server based on product information of the home appliance based on a network connection through the communication unit being successful, and (v) controls operation of the home appliance according to a received control instruction from the terminal or based on the server being connected to the network through the communication unit.

2. The home appliance of claim 1, wherein the tag unit comprises:
   a tag storage unit that stores the product information and the network connection information; and
   a transmitting and receiving unit that recognizes the terminal that contacts the tag unit or communicates with the tag unit when within a predetermined distance.

3. The home appliance of claim 2, wherein the tag unit stores data received from the terminal at the tag storage unit in response to the terminal contacting the tag unit independent of the home appliance being turned on.

4. The home appliance of claim 2, wherein the tag unit is detachably provided on the home appliance.

5. The home appliance of claim 1, wherein:
   the controller instructs the display unit to display a connection state, in response to the home appliance being connected to the network according to the network connection information, and
   the controller instructs the display unit to display an error message, in response to the home appliance not being connected to the network.

6. The home appliance of claim 1, wherein the controller determines a state of the tag unit, receives new data, and updates network connection information, a control program, or controls operation to correspond to new data in response to power of the home appliance being turned on.

7. A home appliance system, comprising: a terminal having a Near Field Communication (NFC) function; a server that stores and manages data associated with a plurality of home appliances; and a home appliance that (i) has a tag unit for NFC, (ii) stores product information at the tag unit, and (iii) is connected to a predetermined network according to network connection information stored at the tag unit by the terminal, wherein the terminal (i) receives the product information stored at the tag unit when contacting the tag unit, (ii) stores the network connection information at the tag unit, (iii) stores the product information associated with the home appliance at the server, (iv) registers the home appliance at the server by matching product information of the home appliance to a network identifier associated with the server, (V) receives and displays data of the home appliance matched to the network identifier, and (vi) remotely controls the home appliance using the network identifier.

8. The home appliance system of claim 7, wherein the terminal receives the product information by contacting the tag unit and stores the network connection information at the tag unit.

9. The home appliance system of claim 7, wherein:
   the terminal stores an application for controlling the home appliance, and
   the terminal performs a product registration to register the home appliance based on the product information based on a home appliance not being registered at the network identifier, in response to the application being executed.

10. The home appliance system of claim 9, wherein the terminal (i) searches for a network to which the terminal can connect, connects to the network, stores the network connection information, and outputs guidance associated with the tag unit, in response to registering a product and (ii) stores the network connection information at the tag unit in response to the tag unit being recognized.

11. A method of controlling a home appliance system, the method comprising:
   starting product registration of a home appliance at a terminal;
   collecting network connection information associated with an available network and storing the network connection information associated with the available network;
   receiving product information associated with the home appliance stored at a tag unit of the home appliance;
   storing the network connection information associated with the available network at the tag unit in response to the terminal interacting with the tag unit of the home appliance using Near Field Communication (NFC);
   releasing tag contact information;
   registering the home appliance by matching product information of the home appliance to a network identifier at a server;
   based on the home appliance being registered at the server, receiving and displaying data of the home appliance from the server using the network identifier; and
   remotely controlling the home appliance using the network identifier.

12. The method of claim 11, further comprising:
   collecting network information associated with other available networks, connecting to an available network of the other available networks, and storing network connection information associated with the available network of the other available networks; and
   displaying a tag method using NFC in response to storing the network connection information associated with the available network of the other available networks.

13. A method of controlling a home appliance, the method comprising:
   determining a state of a tag unit for Near Field Communication (NFC);
   in response to determining the state of the tag unit for Near Field Communication (NFC), storing product information at the tag unit and receiving network connection information stored at a tag unit;
   connecting to a network according to the network connection information;
   determining registration status of the home appliance by connecting to a server in response to the home appliance being connected to the network;
   transmitting data associated with an operation and a state of the home appliance to the server through the network without connecting through the tag unit; and
   controlling operation of the home appliance based on data received from a terminal or the server,
   wherein the home appliance connects to the server using product information of the home appliance, and
   wherein the terminal monitors and controls the home appliance based on the data of the home appliance received from the server and with the network identifier.

14. The method of claim 13, wherein the network connection information is stored at the tag unit by the terminal using NFC.

15. The method of claim 13, further comprising:
   displaying a connection state in response to the home appliance being connected to the network; and
   displaying an error state in response to an error occurring in a connection state.

16. The method of claim 13, further comprising storing product information at the tag unit.

* * * * *